United States Patent
Gololobov

(10) Patent No.: US 6,510,845 B1
(45) Date of Patent: Jan. 28, 2003

(54) METHOD OF ECONOMY OF FUEL AND REDUCTION OF TOXIC MATERIAL IN THE EXHAUST OF ALL THE COMBUSTION ENGINES

(76) Inventor: Aleksandr A Gololobov, 6819 22nd Dr. NE., Marysville, WA (US) 98271

( * ) Notice: Subject to any disclaimer, the term of this patent is extended or adjusted under 35 U.S.C. 154(b) by 0 days.

(21) Appl. No.: 09/941,600

(22) Filed: Aug. 30, 2001

(51) Int. Cl.⁷ ............................................. F02M 23/04
(52) U.S. Cl. ..................................... 123/536; 123/590
(58) Field of Search ................................. 123/536, 539, 123/585, 590

(56) References Cited

U.S. PATENT DOCUMENTS

| | | | | |
|---|---|---|---|---|
| 4,274,386 A | * | 6/1981 | Reyes | 123/591 |
| 4,355,623 A | * | 10/1982 | Graham | 123/585 |
| 4,434,771 A | * | 3/1984 | Slomnicki | 123/539 |
| 5,046,475 A | * | 9/1991 | Thompson | 123/590 |

* cited by examiner

Primary Examiner—Marguerite McMahon

(57) ABSTRACT

Disclosed herein is a system for improving an efficiency of internal combustion engines, which consists of an auxiliary air injection system inserted between a carburetor and intake manifold. The system is comprised of a shaped body member and at least one T-shaped circular insert pressed in the body member which fits with the body member tightly at the upper surface and has a smaller circumference at it's lower portion to provide a passage-way for an air flow. The body member has at least one through opening, at least one air inlet opening at a predetermined angle, and an adjustable valve aperture. The T-shaped circular insert has a through opening and numerous air inlet lines angled in two planes for creating a whirlwind flow of the additional incoming air and providing a homogenized fuel-air mixture.

3 Claims, 3 Drawing Sheets

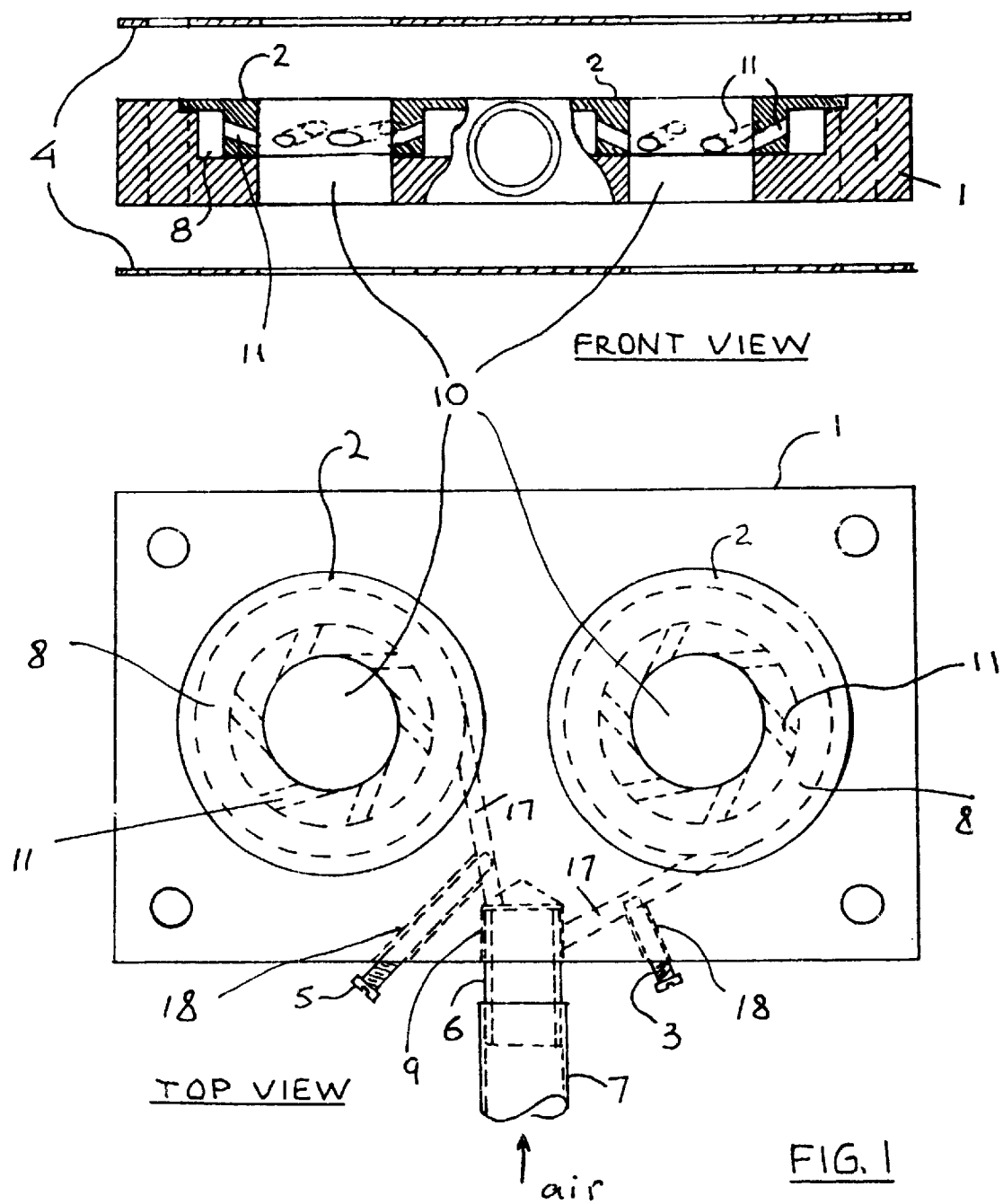

METHOD OF ECONOMY OF FUEL AND REDUCTION OF TOXIC MATERIAL IN THE EXHAUST OF ALL THE COMBUSTION ENGINES

BACKGROUND OF THE INVENTION

1. Field of the Invention

The invention relates to internal combustion engines and particularly to improving the engine's efficiency, fuel economy and reducing pollution by utilizing of a special and improved method of mixing additional air with the fuel-air mixture. This invention can be used in the engines with any number of cylinders. It will eliminate the need for installing catalytic converters on all the new vehicles. Catalytic converters have been used in the attempt to reduce pollution, but they are very expensive and their life span is relatively short and catalytic converters can not be repaired. Also, a catalytic converter has a limited sphere of use.

2. Brief Description of the Prior Art

Today, as never before, the humankind stands before the problems how to save already limited reserves of the fuel and decrease pollutants, specifically from cars.

Numerous patents has been granted attempting to resolve these problems, specifically by employing an additional body member between the carburetor and intake manifold. Devices of this type are those illustrated by the following: U.S. Pat. No. 4,355,623 (Graham); U.S. Pat. No. 5,046,475 (Thompson); U.S. Pat. No. 4,274,386 (Reyes). None of these patents offer the new and improved features of this present invention. For example, the patent to Graham, U.S. Pat. No. 4,355,623 shows a device for introduction of controlled amounts of additional air into a fuel-air mixture. The device doesn't provide a whirlwind effect of the fuel-air mixture and can't reach any sufficient economy of fuel.

The patent to Thompson, U.S. Pat. No. 5,046,475 shows the similar to Graham device, which also introduces an additional air from an air filter directly into the fuel-air mixture. This device, like the previously discussed Graham's patent, doesn't offer a method for thoroughly mixing of the fuel-air mixture.

The patent to Reyes, U.S. Pat. No. 4,274,386 shows a device helping to direct and hold the fuel mixture to the center of the air stream. This device allows receiving more thorough fuel-air mixture, but it doesn't provide an auxiliary air to the mixture, which is one of the important components for the efficient combustion of the fuel. In reality Reye's method brings to an additional consumption of the fuel. Wedge-shaped collectors create a smaller area for the coming through fuel-air mixture and create an additional aerodynamic resistance, which is slowing down the flow of the fuel-air mixture. Therefore a driver has to supply more fuel in the carburetor in order to keep the same power of the engine.

See Johnston and Cooper, U.S. Pat. No. 1,118,865, issued Nov. 24, 1914, which shows an invention related to improved air control via a device that is located between the carburetor and the manifold and gives the air a whirling motion to mix it better and more thoroughly with the gasoline.

There were a few similar patents issued, but they all had a problem in common, the air they utilized was taken directly from the atmosphere, which would cause the engine failure in a very short time. My invention solves that problem by using the clean air that passed through the air filter. Also, other designs are too cumbersome, too complicated and expensive to manufacture, but my invention is simple and inexpensive, and can be used on any internal combustion engine, equipped either with a carburetor or a fuel injector.

See Haynes, U.S. Pat. No. 4,373,500, issued Feb. 15, 1983, which shows a similar idea with mixing air with gasoline-air stream, that might appear similar to my invention, but the construction of the air injection plate is quite different, and the incoming air is made to spin to better mix with tie gas-air mix, and the amount of additional incoming air is regulated to give the vehicle the optimum performance.

See Masaki, U.S. Pat. No. 4,344,401, issued Aug. 17, 1982, shows a system for electrostatically charging fuel. The inventor is on the right track, but his system is too complicated and expensive and doesn't take in the consideration other factors.

The invention is a system that serves two purposes: it saves fuel, and it dramatically reduces air pollution. The invention increases fuel efficiency 30–40%. This effect is reached by thinning out the mixture of gasoline and the air, spinning the mix at the entry point into the engine, electrostatically charging and magnetizing the fuel before entering the carburetor, and creating ozone in the air filter.

BRIEF SUMMARY OF THE INVENTION

This invention is an improvement over those patents in the past, which didn't give enough thorough homogeneity of the fuel-air mixture. Applicant's device uses at the same time the feature of employing the additional regulated air from the air filter and directing it into the fuel-air mixture in such a way that the whirlwind flow has been generated. The whirlwind flow doesn't allow liquid fuel mixture to slide down the sides of the carburetor not mixed with an additional air, which provides a thorough homogeneity of the fuel-air mixture. Thus, it increases efficiency of the engine, saves the gas, and decreases the car's pollutants.

The system consists of a body member employed between the carburetor and intake manifold and T-shaped circular inserts pressed into the body member.

The object is to provide at least one auxiliary air inlet opening in the body member at a predetermined angle.

Another object is to provide a regulated auxiliary air by employing at least one adjustable valve member.

Another object is to shape the upper surface of the body member to fit at least one circular insert at the top and to define an air passageway between the lower portion of the circular insert and a hollow of the body member.

Another object is to provide numerous air inlet lines at predetermined angles in two planes at the lower portion of the T-shaped circular insert to create a whirlwind flow of the fuel-air mixture.

A fuel activator is installed containing a Transformer with two coils, one of them, on the bottom, a low voltage (12 V) coil, connected to source of interrupted current, second coil is a high voltage coil generates 20 KV, to this second coil two metal plates are connected, which are not touching cacti other, they are supported in the fuel inside the fuel activator by insulated supports. The Transformer is enclosed by a dielectric container fixed inside the fuel filter by small insulated supports that hold the Transformer in the center of the Fuel Filter so that the fuel can flow without impediment around the Transformer, and as a result the fuel is electrostatically charged, magnetized and atomized, as to prepare it for the optimum and maximum combustion.

The air injector plate employed in the invention is preferably of aluminum and about 3/8" in thickness, and its dimensions (width and length) depend on the size of the carburetor and the engine.

An important object of the present invention is to provide an air injection system for use in conjunction with internal combustion engine carburetors, which system admits a controlled quantity of additional air and thoroughly blends that air with the electrostatically charged fuel so as to greatly increase the efficiency of the gasoline engine.

Another important object of the present invention is the fact that the air injection plate insulates the carburetor from the intake manifold and reduces undesirable heating of the carburetor, which greatly improves the efficiency with which fuel is atomized. The air circulating through the air injection plate and die fact that there is a heat resistant gasket on the either side of the air injection plate insulates die carburetor even more.

Another object of the invention is to provide an air injection system for admitting auxiliary air to the stream of a vaporous fuel-air mixture passing from a carburetor into the intake manifold, with the auxiliary air being admitted in such a way, during operation of the engine with the automatic choke valve of the carburetor closed that less gasoline is consumed and the engine is operated more efficiently during such time and during idling.

Another important object of the invention is to create ozone inside the air filter or an ozonator added to die standard air filter by means of special electronic system and the high voltage charge applied to the electrodes, which allows much more effective combustion and drastic reduction in the pollution, which allows total elimination of the catalytic converter.

BRIEF DESCRIPTION OF THE SEVERAL VIEWS OF THE DRAWING

FIG. 1–1. Perspective view of the air injection system.

DETAILED DESCRIPTION OF THE DRAWINGS

Figure 1:
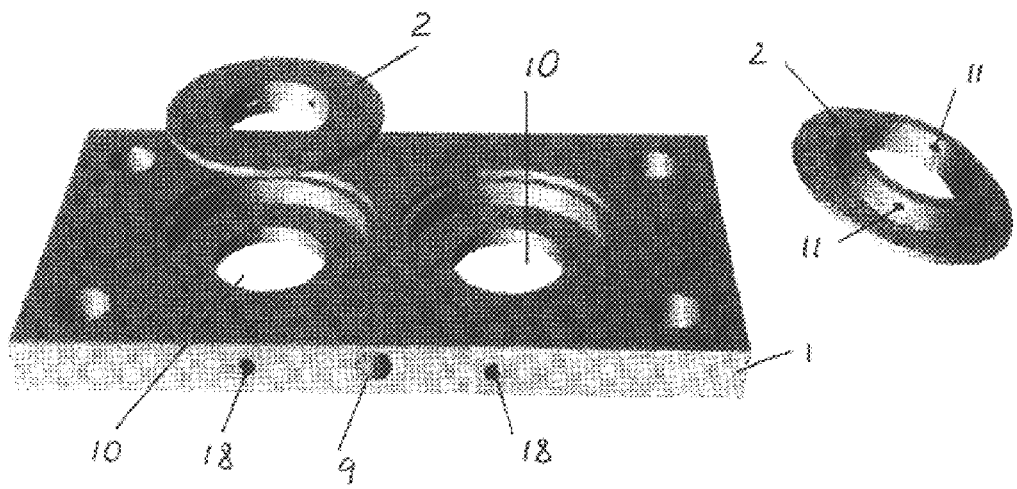
FIG. 1. Top view and the front view of the air injection system assembly.
Figure 2:
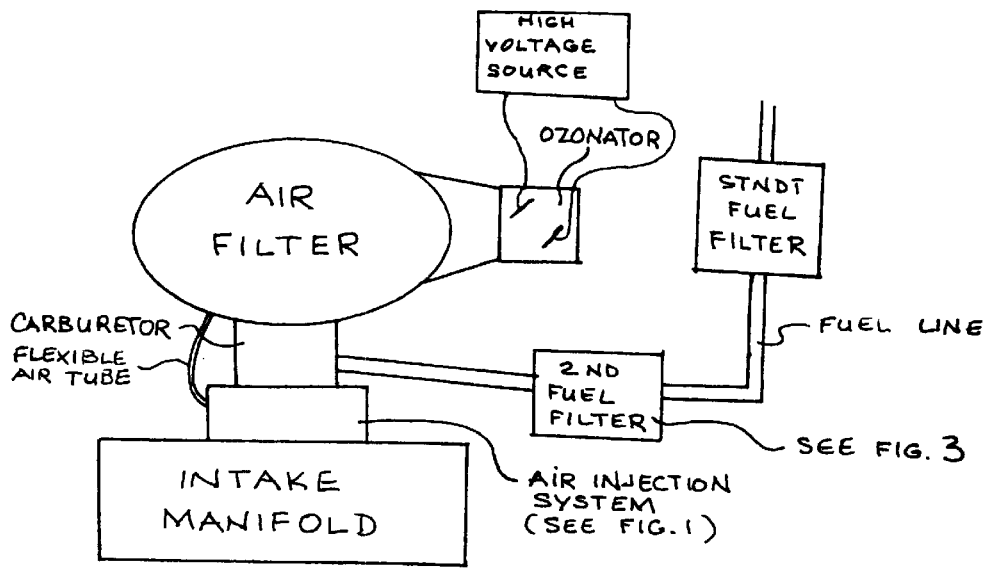
FIG. 2. A diagram showing a suggested system for improving the internal combustion engine's efficiency and reducing pollution.

FIG. 1 and FIG. 2 of the drawings shows the air injection system assembly. A body member 1 is made of aluminum or other suitable material. The body member 1 fits between the carburetor and intake manifold by the use of gaskets 4. There is at least one T-shaped circular insert 2 pressed into the body member 1.

Body member 1 is shaped to fit a circular insert 2 tightly at the upper surface and provide a passageway for an auxiliary air at the lower portion.

Body member 1 has at least one through opening 10, the same size as a through opening 10 of the circular inlet 2.

Body member has at least one opening 17 at a predetermined angle, passing from the outside to passageway and providing an auxiliary air from an air filter to the passageway.

Body member 1 has at least one an adjustable valve aperture 18 for an adjustable valve 3 and 5 to regulate the auxiliary air in the air inlet opening 17.

A short piece of metal stub tubing 6 pressing into an inlet 9. A hose 7 connects directly to the standard air filter.

The T-shaped circular insert 2 has numerous air inlet lines 11 angled in two planes for creating a whirlwind flow of the auxiliary incoming air and providing a homogenized fuel-air mixture.

What is claimed is:

1. An air injection system mounted between the carburetor and the intake manifold of an internal combustion engine, said system comprising:

a body member that fits between the carburetor and the intake manifold, and at least one T-shaped circular insert pressed in said body member;

said body member of predetermined thickness having a shaped upper surface, said body member and said T-shaped circular insert having at least one through opening coinciding with similarly placed at least one opening from the carburetor and at least one opening leading to the intake manifold;

said upper surface of said body member shaped to fit said circular insert at the top and to define an air passageway between the lower side of said circular insert and a hollow of said body member;

said body member having at least one auxiliary air inlet opening at a predetermined angle to said through opening passing from the outside to said air passageway, and providing an auxiliary air from an air filter to said passageway;

said lower portion of said T-shaped circular insert having numerous air inlet lines at predetermined angles in two planes.

2. The air injection system of claim 1, wherein said air inlet lines are angled downwardly toward the central axis of said through opening to provide a twirling flow of the auxiliary air from said passage-way to said through opening to promote thorough homogeneity of said fuel-air mixture.

3. The air injection system of claim 2, having at least 3 air inlet lines arranged evenly at the circumference of the lower portion of the insert.

* * * * *

UNITED STATES PATENT AND TRADEMARK OFFICE
CERTIFICATE OF CORRECTION

PATENT NO. : 6,510,845 B1 Page 1 of 1
DATED : January 28, 2003
INVENTOR(S) : Aleksandr Gololobov It is certified that error appears in the above-identified patent and that said Letters Patent is hereby corrected as shown below:

Title page,
After the ABSTRACT, "3 Claims, 3 Drawing Sheets" should read -- 3 Claims, 2 Drawing Sheets --

Figure 3:
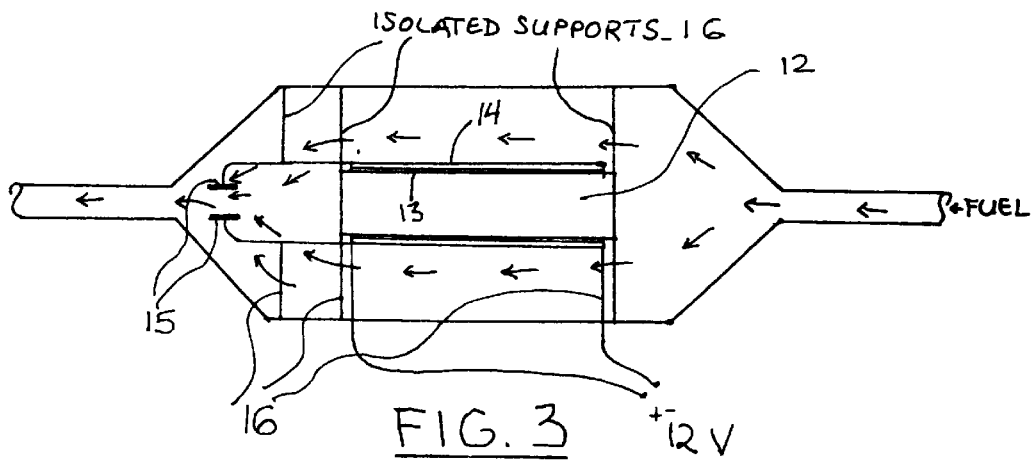
FIG. 3. Fuel Activator with a Transformer.

Drawings,
Cancel Sheet 3 of 3 of the drawings, Fig. 2 and Fig. 3 from the patent.

Column 1,
Lines 15-20, cancel beginning with "It will eliminate the need…" to and including "…has a limited sphere of use."

Column 1, line 56 - Column 2, line 25,
Cancel beginning with "See Johnson and Cooper…" to and including "…creating ozone in the air filter."

Column 2, line 54 - Column 3, line 33,
Cancel beginning with "A fuel activator is installed…" to and including "…elimination of the catalytic converter."

Column 3,
Lines 41-44, cancel beginning with "Fig. 2. A diagram…" to and including "…reduction pollution."

Signed and Sealed this

Seventeenth Day of June, 2003

JAMES E. ROGAN
*Director of the United States Patent and Trademark Office*